United States Patent
Kollbach et al.

(10) Patent No.: US 9,580,538 B2
(45) Date of Patent: Feb. 28, 2017

(54) ROBUST ADHESIVES FOR LAMINATING FLEXIBLE PACKAGING MATERIAL

(75) Inventors: Guido Kollbach, Apex, NC (US); Balasubramaniam Ramalingam, Cary, NC (US)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 13/280,026

(22) Filed: Oct. 24, 2011

(65) Prior Publication Data

US 2012/0128991 A1 May 24, 2012

Related U.S. Application Data

(60) Provisional application No. 61/405,885, filed on Oct. 22, 2010.

(51) Int. Cl.

| | | |
|---|---|---|
| *A47G 19/22* | (2006.01) | |
| *B28B 21/00* | (2006.01) | |
| *B29D 22/00* | (2006.01) | |
| *B29D 23/00* | (2006.01) | |
| *B31B 45/00* | (2006.01) | |
| *B32B 1/08* | (2006.01) | |
| *B32B 15/08* | (2006.01) | |
| *B32B 27/00* | (2006.01) | |
| *B32B 27/10* | (2006.01) | |
| *B32B 27/32* | (2006.01) | |
| *B32B 27/40* | (2006.01) | |
| *C03C 17/32* | (2006.01) | |
| *C08G 18/00* | (2006.01) | |
| *C08G 18/08* | (2006.01) | |
| *C08G 18/28* | (2006.01) | |
| *C08L 75/00* | (2006.01) | |
| *C09J 4/00* | (2006.01) | |
| *C09J 101/00* | (2006.01) | |
| *C09J 201/00* | (2006.01) | |
| *F16L 9/10* | (2006.01) | |
| *C08G 18/10* | (2006.01) | |
| *C08G 18/12* | (2006.01) | |
| *C08G 18/40* | (2006.01) | |
| *C08G 18/42* | (2006.01) | |
| *C09J 175/06* | (2006.01) | |
| *B32B 7/12* | (2006.01) | |
| *B32B 15/085* | (2006.01) | |
| *B32B 15/09* | (2006.01) | |
| *B32B 27/08* | (2006.01) | |
| *B32B 27/36* | (2006.01) | |

(52) U.S. Cl.
CPC .............. *C08G 18/10* (2013.01); *B32B 7/12* (2013.01); *B32B 15/085* (2013.01); *B32B 15/09* (2013.01); *B32B 27/08* (2013.01); *B32B 27/32* (2013.01); *B32B 27/36* (2013.01); *C08G 18/12* (2013.01); *C08G 18/4018* (2013.01); *C08G 18/4202* (2013.01); *C08G 18/4238* (2013.01); *C09J 175/06* (2013.01); *B32B 2439/00* (2013.01); *Y10T 428/31565* (2015.04); *Y10T 428/31587* (2015.04); *Y10T 428/31605* (2015.04)

(58) Field of Classification Search
CPC ..... C08G 18/10; C08G 18/12; C08G 18/4018; C08G 18/4202; C08G 18/4238; B32B 7/12; B32B 15/085; B32B 15/09; B32B 27/08; B32B 27/32; B32B 27/36; B32B 2439/00; C09J 175/06; Y10T 428/1565; Y10T 428/31605; Y10T 428/31587
USPC .......... 524/589, 590; 528/44, 85; 156/331.7; 428/34.1, 34.3, 34.7, 35.2, 35.3, 35.7, 35.8, 428/35.9, 423.1, 423.7, 424.2, 424.8, 425.8

See application file for complete search history.

(56) References Cited

U.S. PATENT DOCUMENTS

| | | |
|---|---|---|
| 5,998,538 A | 12/1999 | Meckel et al. |
| 6,617,031 B1 | 9/2003 | Glasbrenner |
| 7,364,796 B2 | 4/2008 | Sasano et al. |
| 8,382,937 B2 | 2/2013 | Simons, Jr. |
| 2003/0215646 A1 | 11/2003 | Glasbrenner |
| 2006/0105187 A1 | 5/2006 | Simons, Jr. et al. |
| 2006/0105188 A1* | 5/2006 | Simons ................. 428/483 |

FOREIGN PATENT DOCUMENTS

| | | |
|---|---|---|
| CN | 1242782 A | 1/2000 |
| CN | 1726242 A | 1/2006 |
| EP | 0150444 A2 | 8/1985 |
| EP | 1518874 A1 | 3/2005 |
| JP | 2009019120 A | 1/2009 |

* cited by examiner

*Primary Examiner* — Patrick Niland
(74) *Attorney, Agent, or Firm* — James E. Piotrowski

(57) ABSTRACT

A robust, two component adhesive for laminating flexible packaging material comprising a mixture of Component A and Component B. Component A comprises an isocyanate-functionalized compound. Component B comprises a mixture of a high functionality polyol containing at least four hydroxyl groups per molecule with at least two primary OH groups on the molecule and two secondary OH groups on the molecule and a trifunctional polyol containing three OH groups on the molecule. Component B can contain a difunctional polyol containing two OH groups on the molecule. The adhesive is robust and retains desirable properties when used at varying A:B mix ratios better than conventional laminating adhesives used at the same mix ratios.

14 Claims, 4 Drawing Sheets

Room Temperature Cure Speed and Bond Strength at Varying Mix Ratios

ROBUST ADHESIVES FOR LAMINATING FLEXIBLE PACKAGING MATERIAL

FIELD

Disclosed are two component laminating adhesives in which one component comprises an isocyanate-functionalized compound such as NCO-terminated polyurethane prepolymer and a second component comprises a specific mixture of polyols, at least one of which contains four or more hydroxyl groups per molecule. The two components are combined and the resulting adhesive can be used to form a flexible packaging material.

BACKGROUND

Product packaging has been changing from sealed metal cans and glass bottles to sealed flexible packages such as pouches. As one example tuna fish is now available in both traditional metal cans and flexible pouches. The flexible package when filled with a food or other product and closed or sealed can be readily changed in shape. The flexible package is typically prepared from two layers of flexible packaging material that are overlaid and sealed around most of their periphery to form a cavity inside. Typically the two layers of flexible packaging material are heat sealed by applying heat and pressure to fuse the layers together around a thin portion of the package periphery. Food or other product is placed in the cavity through an opening and the opening is closed by heat sealing the layers together. The sealed package and enclosed product can be heated for preservation purposes. In some demanding applications the sealed package and enclosed product can be boiled in water at 100° C.

Flexible packaging material is prepared by laminating two or more layers of film. Each film is chosen for specific properties. For example, a flexible packaging material can be a lamination of three layers. The inner layer will contact the packaged product. Polypropylene has desirable product contact properties as well as heat sealability and can be used as an inner layer. The middle layer will provide a barrier to moisture, oxygen and/or light. Metal films or foils have desirable barrier properties and metal films such as aluminum foil can be used as a middle layer. The outer layer will provide protection for the package and also provides a surface for printing information such as contents, packaging date, warnings, etc. Polyester films are tough, can receive printing ink and can be used as an outer layer. Flexible packaging material can range in thickness from about 13 to about 75 micrometers (0.0005 inches to 0.003 inches).

Each layer of the flexible packaging material is bonded to the adjacent layer by an adhesive. Adhesive can be applied to the layer from a solution in a suitable solvent using gravure or smooth roll coating cylinders or from a solvent-free state using special application machinery and that layer is laminated to another layer. The laminated packaging material is dried if necessary and accumulated in rolls. The rolls are kept in storage for a predetermined amount of time to allow the adhesive to cure before use in some applications.

Although there are many possible types of adhesives, polyurethane based adhesives are preferred for use in flexible packaging materials because of their many desirable properties including good adhesion to the materials in each layer, high peel strength, resistance to heat such as from heat sealing or retorting, and resistance to chemically aggressive products. Typically, an isocyanate-containing polyurethane prepolymer obtained by the reaction of excess diisocyanate with a polyether and/or polyester containing two or more active hydrogen groups per molecule is used in combination with a second component. The second component is usually a polyether polyol and/or a polyester polyol. The two components are combined just before use and in a predetermined ratio and applied on one of the film surfaces and the coated film is laminated to another substrate.

Solvent is used as a diluent for some polyurethane laminating adhesives as the viscosity of those adhesives is too high to apply them reliably in liquid form in a roll to roll laminating process. Solventless laminating adhesives (adhesives that can be applied at 100% solids and that do not contain either organic solvents or water) have a distinct advantage in that they can be applied and run at very high line speeds. This is due to the fact that no organic solvent or water has to be removed from the adhesive by drying. Solvent- or water-based laminating adhesives are limited to an application speed at which the solvent or water can be effectively dried in an oven. Typical line speeds for solvent-based and water-based laminating adhesives are 300 to 600 feet per minute due to the drying restrictions. Solventless adhesives, on the other hand, can be applied at 900 to even 2000 feet per minute, a line speed not possible with solvent-based and water-based laminating adhesives. Solventless laminating adhesives thus have a distinct advantage over solvent-based or water-borne adhesives.

In order that the proper coating weight of laminating adhesive is applied to the substrate, the adhesive must be "metered down" by transfer rolls to the application web or substrate. This is generally achieved by transferring the adhesive from a "puddle" between two rolls to a second and sometimes third or fourth roll before applying to the substrate. Each subsequent transfer rolls turn at a speed higher than the former roll so that there is less adhesive on each subsequent roll. Since these rolls are rotating at speeds up to 1000 rpm, incomplete transfer of the adhesive typically occurs with the formation of adhesive "droplets" that are released into the air around the metering rolls. These adhesive "droplets" are seen as aerosol droplets that are commonly called "adhesive mist". Adhesive misting is undesirable.

Some solventless polyurethane laminating adhesives have to be heated to 100° C. to achieve a viscosity suitable for use in laminating packaging material. These high temperatures are difficult to achieve and control and are not energy efficient. In order to bring application temperature down, molecular weight of the polyurethane prepolymers was lowered, but the missing molecular weight had to be recovered by adding a second component to the adhesive mixture, mostly a blend of polyols. The application temperature for these modified polyurethane laminating adhesives could be reduced to about 40° C.

Another concern for flexible packaging material manufactured for the use as food packaging is government regulations. Government regulations require that the food packaging be safe when in contact with food. Unreacted isocyanate monomers can migrate into the food. This is problematic especially for aromatic isocyanate based adhesives. The reaction of these monomers with moisture in the packaged food turns them into primary aromatic amines, which are carcinogenic and not allowed in food items. One solution is to keep the flexible packaging material in storage until the adhesive components are fully reacted. After the adhesive components are fully reacted the flexible packaging material is formed into pouches. Unfortunately in case of laminating adhesives using lower molecular weight prepolymers and polyols this could take a long time, even up to a couple of weeks, and involve storage of large amounts of expensive laminating material before it can be used.

One strategy used in laminating adhesives to reduce cure time is to reduce isocyanate monomer content of the isocyanate prepolymers. This can be achieved by stripping monomers from the adhesive as described in EP 1 518 874. But this process is technically challenging, time consuming and expensive. Another strategy used in polyurethane laminating adhesives to reduce the monomer content is to utilize the different reactivity of the isocyanate groups of asymmetric multifunctional isocyanates. This approach is described in EP 0 150 444. The downside of this approach is that low monomer prepolymers cannot be manufactured with symmetrical isocyanates following this procedure. In both strategies, stripping and usage of asymmetric diisocyanates as raw materials, the viscosity of the resulting prepolymer is high as compared to the second generation systems. Nevertheless polyurethane adhesives based on these types of prepolymers reduce the storage time needed to be FDA compliant dramatically. But these systems require application at 70° C., which is not desirable for manufacturing or cleaning the laminating machinery.

Another concern of two component systems is the pot-life. Unless otherwise specifically described pot-life is the time required for the mixed adhesive to double its as mixed viscosity. For example, in a system that is applied at 40° C. with an as mixed viscosity of 1000 cps, the pot-life would be the time needed for that mixed adhesive to reach 2000 cps. Typically 2-component polyurethane adhesives have pot-lives of 15-20 minutes. In flexible packaging material lamination once the adhesive viscosity increases to a certain point the machinery must undesirably be shut down and cleaned. In order to maximize pot-life and minimize machinery shutdown and cleaning, special dosing units, so called meter mix dispense units (MMD's) are used to feed freshly mixed adhesive to the application station on an as needed basis.

As long as these systems are well maintained the isocyanate component and polyol component will be mixed in a specific mix ratio and the freshly mixed adhesive will (semi-)continuously be fed into the application station of the laminator. In case of an unpredicted interruption of the manufacturing process, for example due to a web break on the laminator, the mixed adhesive in the laminating machinery will build up viscosity and have to be discarded and the laminator applicator rolls will have to be cleaned. Fast curing adhesives with short pot lives tend to cause more problems in these cases and are not very desirable. Therefore a long pot-life is desired by laminating machine operators.

If the MMD is not well maintained the mix ratio can shift and the adhesive would be applied with too much polyol component or too much isocyanate component. The typical recommendation for a variance in the mix ratio is only ±5 wt %. If the mix ratio shifts and more than 5% excess polyol component is used in the mixture the cured adhesive will not show full performance, for example it will have lower heat resistance, leading to failures during heating or retorting of the sealed food package. If the mix ratio shifts and more than 5% excess isocyanate component is used the flexible packaging material can need an extended time to cure and reach FDA compliance, sometimes up to weeks.

A further concern of laminating adhesives is resistance to external solvents. The exterior surface of flexible packages is typically covered with printing or graphics. Flexographic printing inks used on flexible packages are blended with monoalcohols like Dowanol PM to improve the laydown of the ink. Depending on their vapor pressure these alcohols are easy or difficult to remove from the printed film. Higher molecular weight alcohols like Dowanol PM, which chemically is propyleneglycol mono-methylether, are referred to a "high boilers". The solvents act as a polyurethane chain stopper and undesirably interfere with polymerization and bond strength of a polyurethane adhesive.

If "high boilers" are not removed completely they can undesirably interfere with the two component polyurethane adhesive reaction in the laminating flexible packaging material. To avoid undesirable effects the recommended limit for mono-alcohols in flexible laminating material applications is very low (<3,900 mg/ream of material, preferably <1,000 mg/ream of material and some applications require <100 mg/ream of material).

It would be desirable to provide a solvent less polyurethane laminating adhesive that does not require technically difficult preparation methods such as monomer stripping and which is useful with transfer roll lamination equipment and which can be applied at 100° C. or less and preferably about 40° C. or less.

It would also be desirable to provide a polyurethane laminating adhesive that has a long pot-life, for example greater than about 25 minutes, more preferably greater than about 30 minutes or more at application temperatures even when the isocyanate and polyol components are mixed off ratio with more than 5% excess, more preferably a 15% excess, more preferably a 25% excess, of polyol component or with more than 5% excess, more preferably a 15% excess, more preferably a 25% excess, of isocyanate component.

It would be desirable to provide a polyurethane laminating adhesive that can produce flexible packaging material with sufficient cured bond strength to withstand temperatures up to 100° C. and a boiling water environment even when the isocyanate and polyol components are mixed off ratio with more than 5% excess, more preferably a 15% excess, more preferably a 25% excess, of polyol component or with more than 5% excess, more preferably a 15% excess, more preferably a 25% excess, of isocyanate component.

It would be desirable to provide a polyurethane laminating adhesive that cures quickly and does not react with food simulants or products in a flexible package to form primary amines even when the isocyanate and polyol components are mixed off ratio with more than 5% excess, more preferably a 15% excess, more preferably a 25% excess, of polyol component or with more than 5% excess, more preferably a 15% excess, more preferably a 25% excess, of isocyanate component.

SUMMARY

The present disclosure provides a two component laminating adhesive comprising Component A and Component B. Component A comprises an isocyanate-functionalized compound. Component B comprises a mixture of a high functionality polyester polyol containing at least four hydroxyl groups per molecule with at least two primary OH groups on the molecule and two secondary OH groups on the molecule and a trifunctional polyol containing three OH groups on the molecule. The trifunctional polyol can be a trifunctional polyether polyol.

In one embodiment Component A comprises an isocyanate-functionalized compound. Component B comprises a mixture of a high functionality polyester polyol containing at least four hydroxyl groups per molecule with at least two primary OH groups on the molecule and two secondary OH groups on the molecule; and a trifunctional polyol containing three OH groups on the molecule. The trifunctional polyol can be a trifunctional polyether polyol.

In one embodiment Component A comprises an isocyanate-functionalized compound. Component B comprises about 50 wt % to about 90 wt % high functionality polyester polyol containing at least four hydroxyl groups per molecule with at least two primary OH groups on the molecule and two secondary OH groups on the molecule; about 5 wt % to about 30 wt % trifunctional polyol containing three OH groups on the molecule; and about 0 wt % to about 20 wt % difunctional polyol containing two OH groups on the molecule.

Flexible packaging adhesives prepared using the disclosed components have some or all of the following properties. They are useful with conventional flexible packaging material production equipment such as meter mix dispensers and transfer roll lamination equipment; can be applied at 100° C. or less and preferably about 40° C. or less; have a pot-life of about 25 minutes or more to initial viscosity doubling, preferably 30 minutes or more to initial viscosity doubling; provide the flexible packaging material with sufficient high temperature strength for heating or retorting; are resistant to chemicals found in food products; and do not migrate into food simulants or products. Preferably, flexible packaging adhesives prepared using the disclosed components are also resistant to chemicals used in packaging materials such as solvents and inks; Lamination adhesives prepared using the disclosed components will have a predetermined or "on ratio" ratio of isocyanate to polyol component. Flexible packaging adhesives prepared using the disclosed components are "robust". As used herein a robust flexible packaging adhesive is a laminating adhesive that can retain its desirable properties when prepared using a 5% excess of isocyanate component or polyol component; preferably a 15% excess of isocyanate component or polyol component and more preferably a 25% excess of isocyanate component or polyol component. A laminating adhesive that does not retain properties throughout the range from excess isocyanate component through "on ratio" mixture to excess polyol component will not be a robust flexible packaging adhesive and is not part of this invention.

In one embodiment a flexible packaging material is formed by combining and mixing Components A and B in an approximate 1.6:1 ratio by weight to form a polyurethane laminating adhesive. The mixed adhesive is disposed onto selected films using known equipment and the films are laminated to form flexible packaging material. The flexible packaging material is cured.

As used herein percentages are by weight unless otherwise specifically described.

The disclosed compounds include any and all isomers and stereoisomers. In general, the disclosed compositions may be alternately formulated to comprise, consist of, or consist essentially of, any appropriate components herein disclosed. The disclosed compositions may additionally, or alternatively, be formulated so as to be devoid, or substantially free, of any components, materials, ingredients, adjuvants or species used in the prior art compositions or that are otherwise not necessary to the achievement of the disclosed function and/or objectives.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

DETAILED DESCRIPTION

Figure 1:
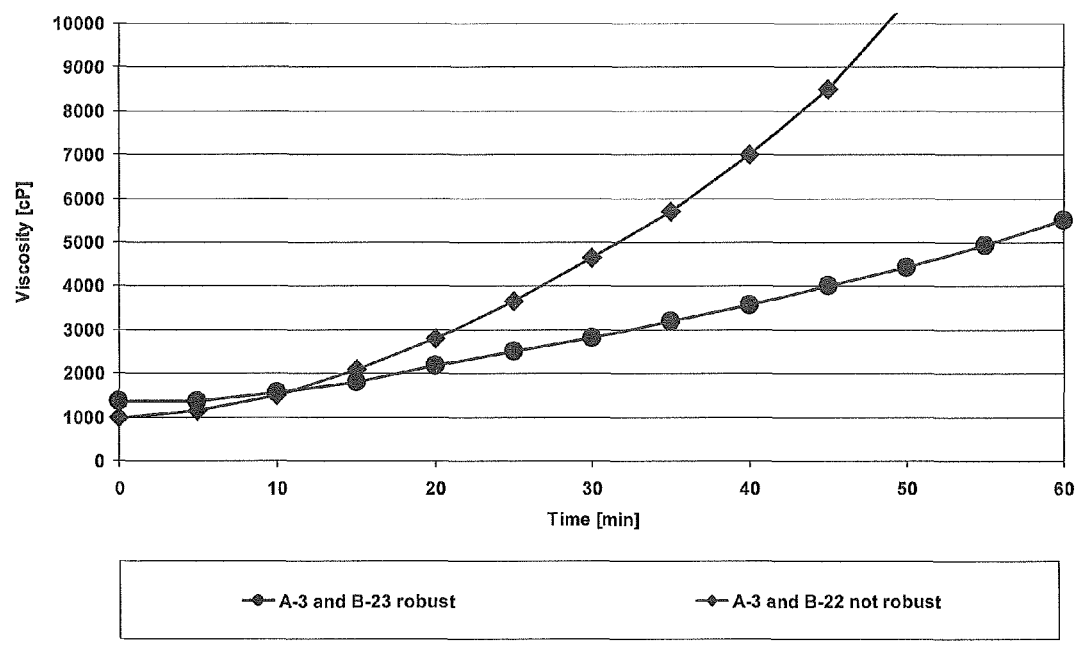
FIG. 1 is a graph showing improved pot-life of the disclosed robust adhesive compared to a conventional adhesive.

The disclosed robust flexible packaging adhesives comprise a substantially homogeneous mixture of Component A, an isocyanate-functionalized compound, and Component B, a mixture of polyol compounds. Components A and B are stored separately and mixed in a predetermined ratio just before use. Flexible packaging adhesives prepared using Components A and B are "robust flexible packaging adhesives".

Component A

Component A contains at least one compound having two or more isocyanate groups per molecule. The isocyanate groups may be free —NCO groups, but can also be blocked or masked —NCO groups. One particular embodiment employs one or more isocyanate-functionalized polyurethane prepolymers in Component A. In the context of this disclosure a polyurethane prepolymer is a compound such as results, for example, from the reaction of a polyol component (or other active hydrogen-functionalized compound) with at least one isocyanate having a functionality of at least two. This reaction can take place without solvent or in a solvent. The term "polyurethane prepolymer" embraces not only compounds having a relatively low molecular weight, such as are formed, for example, from the reaction of a polyol with an excess of polyisocyanate, but also oligomeric or polymeric compounds. "Perfect" polyurethane prepolymers, containing a single polyol moiety capped at each end or terminus with a polyisocyanate moiety and very little, if any, free polyisocyanate monomer or oligomeric or polymeric compounds (containing two or more polyol moieties per molecule) may also be utilized.

Molecular weight figures used in this document, unless otherwise indicated, refer to number average molecular weight ($M_n$). The polyurethane prepolymers used in the context of the present disclosure generally may have a molecular weight of from 500 to 27,000, alternatively from 700 to 15,000, or alternatively from 700 to 8,000 g/mol.

Likewise embraced by the term "polyurethane prepolymers" are compounds formed, for example, from the reaction of a trivalent or tetravalent polyol with a molar excess of diisocyanate, relative to the polyol. In this case one molecule of the resultant compound bears two or more isocyanate groups.

Polyurethane prepolymers having isocyanate end groups are well known in the art. They can be crosslinked or chain-extended with suitable curing agents—usually polyfunctional alcohols—in a simple way to form substances of higher molecular weight.

To obtain polyurethane prepolymers having terminal isocyanate groups it is customary to react polyfunctional alcohols with an excess of polyisocyanates, generally at least predominantly diisocyanates. In this case the molecular weight can be controlled at least approximately by way of the ratio of OH groups to isocyanate groups. While a ratio of OH groups to isocyanate groups of 1:1 or near to 1:1 often leads to substances with high molecular weights, it is the case with a ratio of approximately 1:2, for example, when using diisocyanates, that one diisocyanate molecule is attached on average to each OH group, so that in the course of the reaction, in the ideal case, there is no oligomerization or chain extension.

Excess unreacted polyisocyanate monomer may optionally be removed from the polyurethane prepolymer reaction product initially obtained by any known method such as, for example, distillation to provide a prepolymer having a desirably low level of polyisocyanate monomer (e.g., less than 1 weight %).

Polyurethane prepolymers are customarily prepared by reacting at least one polyisocyanate, preferably a diisocyanate, and at least one component having functional groups which are reactive toward isocyanate groups, generally a polyol component, which is preferably composed of diols. The polyol component may contain only one polyol, although it is also possible to use a mixture of two or more polyols as the polyol component. By a polyol is meant a polyfunctional alcohol, i.e., a compound having more than one OH group in the molecule.

By "functional groups which are reactive toward isocyanate groups" are meant, in the context of the present text, functional groups which can react with isocyanate groups to form at least one covalent bond.

Suitable reactive functional groups containing active hydrogen may be monofunctional in the sense of a reaction with isocyanates: OH groups or mercapto groups, for example. Alternatively, they may also be difunctional with respect to isocyanates (primary amino groups, for example). A molecule containing a primary amino group, accordingly, also has two functional groups which are reactive toward isocyanate groups. In this context it is unnecessary for a single molecule to have two separate functional groups that are reactive toward isocyanate groups. What is critical is that the molecule is able to connect with two isocyanate groups with the formation in each case of one covalent bond.

As the polyol component of Component A it is possible to use a multiplicity of polyols. These are, for example, aliphatic alcohols having from 2 to 4 OH groups per molecule. The OH groups may be primary or secondary. Examples of suitable aliphatic alcohols include ethylene glycol, propylene glycol, butane-1,4-diol, pentane-1,5-diol, hexane-1,6-diol, heptane-1,7-diol, octane-1,8-diol and their higher homologs or isomers such as result in a formal sense from a stepwise extension of the hydrocarbon chain by one $CH_2$ group in each case or with the introduction of branches into the carbon chain. Likewise suitable are higher polyfunctional alcohols such as, for example, glycerol, trimethylolpropane, pentaerythritol and also oligomeric ethers of said substances with themselves or in a mixture of two or more of said ethers with one another.

As the polyol component it is additionally possible to use reaction products of low molecular weight polyfunctional alcohols with alkylene oxides, referred to as polyether polyols. The alkylene oxides have preferably 2 to 4 carbon atoms. Suitable examples are the reaction products of ethylene glycol, propylene glycol, the isomeric butanediols, hexanediols or 4,4'-dihydroxy-diphenylpropane with ethylene oxide, propylene oxide or butylene oxide, or with mixtures of two or more thereof. Also suitable, furthermore, are the reaction products of polyfunctional alcohols, such as glycerol, trimethylolethane or trimethylolpropane, pentaerythritol, sugars or sugar alcohols, or mixtures of two or more thereof, with the stated alkylene oxides to form polyether polyols. Particularly suitable polyether polyols are those having a molecular weight from about 100 to about 10,000, preferably from about 200 to about 5,000. Likewise suitable as the polyol component are polyether polyols such as are formed, for example, from the polymerization of tetrahydrofuran.

The polyether polyols may be synthesized using methods known to the skilled worker, by reaction of the starting compound having a reactive hydrogen atom with alkylene oxides: for example, ethylene oxide, propylene oxide, butylene oxide, styrene oxide, tetrahydrofuran or epichlorohydrin or mixtures of two or more thereof. Examples of suitable starting compounds are water, ethylene glycol, propylene 1,2-glycol or 1,3-glycol, butylene 1,4-glycol or 1,3-glycol, hexane-1,6-diol, octane-1,8-diol, neopentylglycol, 1,4-hydroxymethylcyclohexane, 2-methyl-1,3-propanediol, glycerol, trimethylolpropane, hexane-1,2,6-triol, butane-1,2,4-triol, trimethylolethane, pentaerythritol, mannitol, sorbitol, methylglycosides, sugars, phenol, isononylphenol, resorcinol, hydroquinone, 1,2,2- or 1,1,2-tris(hydroxyphenyl)ethane, ammonia, methylamine, ethylenediamine, tetra- or hexamethyleneamine, triethanolamine, aniline, phenylenediamine, 2,4- and 2,6-diaminotoluene and polyphenylpolymethylene-polyamines (such as are obtainable by aniline-formaldehyde condensation), or mixtures of two or more thereof.

Likewise suitable for use as the polyol component are polyether polyols which have been modified by vinyl polymers. Products of this kind are available, for example, by polymerizing styrene or acrylonitrile, or a mixture thereof, in the presence of polyether polyols.

Polyester polyols having a molecular weight of from about 200 to about 10,000 are likewise suitable as the polyol component. Thus, for example, it is possible to use polyester polyols formed by reacting low molecular weight alcohols, especially ethylene glycol, diethylene glycol, neopentyl glycol, hexanediol, butanediol, propylene glycol, glycerol or trimethylolpropane, with caprolactone. Likewise suitable as polyfunctional alcohols for preparing polyester polyols are 1,4-hydroxymethylcyclohexane, 2-methyl-1,3-propanediol, butane-1,2,4-triol, triethylene glycol, tetraethylene glycol, polyethylene glycol, dipropylene glycol, polypropylene glycol, dibutylene glycol and polybutylene glycol.

Further suitable polyester polyols are preparable by polycondensation. For instance, difunctional and/or trifunctional alcohols can be condensed with a substoichiometric amount of dicarboxylic acids and/or tricarboxylic acids, or their reactive derivatives, to form polyester polyols. Examples of suitable dicarboxylic acids are adipic acid or succinic acid and their higher homologs having up to 16 carbon atoms, unsaturated dicarboxylic acids such as maleic acid or fumaric acid, and also aromatic dicarboxylic acids, particularly the isomeric phthalic acids, such as phthalic acid, isophthalic acid or terephthalic acid. Examples of suitable tricarboxylic acids are citric acid or trimellitic acid. These acids may be used individually or as mixtures of two or more thereof. Particularly suitable in the context of this disclosure are polyester polyols formed from at least one of said dicarboxylic acids and glycerol which have a residual OH group content. Particularly suitable alcohols are hexanediol, ethylene glycol, diethylene glycol or neopentyl glycol or mixtures of two or more thereof. Particularly suitable acids are isophthalic acid or adipic acid or their mixtures.

Polyester polyols of high molecular weight include, for example, the reaction products of polyfunctional alcohols, preferably difunctional alcohols (together where appropriate with small amounts of trifunctional alcohols) and polyfunctional carboxylic acids, preferably difunctional carboxylic acids. Instead of free polycarboxylic acids use may also be made (if possible) of the corresponding polycarboxylic anhydrides or corresponding polycarboxylic esters with alcohols having preferably 1 to 3 carbon atoms. The polycarboxylic acids may be aliphatic, cycloaliphatic, aromatic or heterocyclic or both. They may where appropriate be substituted, by alkyl groups, alkenyl groups, ether groups or halogens, for example. Examples of suitable polycarboxylic acids include succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetra-chlorophthalic anhydride, endomethylenetetrahydrophthalic anhydride, glutaric anhydride, maleic acid, maleic anhydride, fumaric acid, dimer fatty acid or trimer fatty acid or mixtures of two or more thereof. Where appropriate, minor amounts of monofunctional fatty acids may be present in the reaction mixture.

The polyester polyols may, where appropriate, contain a small fraction of carboxyl end groups. Polyester polyols obtainable from lactones, ε-caprolactone for example, or hydroxycarboxylic acids, o-hydroxycaproic acid for example, may likewise be used.

Polyacetals and polyester ether polyols are likewise suitable as the polyol component. By polyacetals are meant compounds obtainable from glycols reacted with aldehydes, for example, diethylene glycol or hexanediol or a mixture thereof condensed with formaldehyde. Polyacetals which can be used in the context of the disclosure may likewise be obtained by the polymerization of cyclic acetals.

Further suitable polyols include polycarbonates. Polycarbonates can be obtained, for example, by reacting diols, such as propylene glycol, butane-1,4-diol or hexan-1,6-diol, diethylene glycol, triethylene glycol or tetraethylene glycol, or mixtures of two or more thereof, with diaryl carbonates, for example, diphenyl carbonate, or phosgene.

Likewise suitable as the polyol component are polyacrylates which carry OH groups. These polyacrylates are obtainable, for example, by polymerizing ethylenically unsaturated monomers which carry an OH group. Monomers of this kind are obtainable, for example, by esterifying ethylenically unsaturated carboxylic acids and difunctional alcohols, the alcohol generally being present in a slight excess. Examples of ethylenically unsaturated carboxylic acids suitable for this purpose are acrylic acid, methacrylic acid, crotonic acid or maleic acid. Corresponding esters carrying OH groups are, for example, 2-hydroxyethyl acrylate, 2-hydroxyethyl methacrylate, 2-hydroxypropyl acrylate, 2-hydroxypropyl acrylate, 2-hydroxypropyl methacrylate, 3-hydroxypropyl acrylate or 3-hydroxypropylmethacrylate or mixtures of two or more thereof.

In addition to the aforedescribed polyol compounds, polyisocyanates are important building blocks of the polyurethane prepolymers which can be used in Component A. These include compounds of the general structure O=C=N—X—N=C=O, where X is an aliphatic, alicyclic or aromatic radical, such as an aliphatic or alicyclic radical having from 4 to 18 carbon atoms.

As suitable polyisocyanates mention may be made, for example, of 1,5-naphthylene diisocyanate, 4,4'-diphenylmethane diisocyanate (MDI), hydrogenated MDI ($H_{12}$MDI), xylylene diisocyanate (XDI), tetramethylxylylene diisocyanate (TMXDI), 4,4'-diphenyldimethylmethane diisocyanate, di- and tetraalkylenediphenylmethane diisocyanate, 4,4'-dibenzyl diisocyanate, 1,3-phenylene diisocyanate, 1,4-phenylene diisocyanate, the isomers of tolylene diisocyanate (TDI), 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), chlorinated and brominated diisocyanates, phosphorus-containing diisocyanates, 4,4'-diisocyanatophenylperfluoroethane, tetramethoxybutane 1,4-diisocyanate, butane 1,4-diisocyanate, hexane 1,6-diisocyanate (HDI), dicyclohexylmethane diisocyanate, cyclohexane 1,4-diisocyanate, ethylene diisocyanate, bisisocyanatoethyl phthalate and also diisocyanates having reactive halogen atoms, such as 1-chloromethylphenyl 2,4-diisocyanate, 1-bromomethylphenyl 2,6-diisocyanate, 3,3-bischloromethyl ether 4,4'-diphenyl diisocyanate.

Sulfur-containing polyisocyanates are obtained, for example, by reacting 2 mol of hexamethylene diisocyanate with 1 mol of thiodiglycol or dihydroxydihexyl sulfide. Further diisocyanates which can be used are, for example, trimethylhexamethylene diisocyanate, 1,4-diisocyanatobutane, 1,12-diiso-cyanatododecane and dimer fatty acid diisocyanate. Particularly suitable are the following: tetramethylene, hexamethylene, undecane, dodecamethylene, 2,2,4-trimethylhexane, 1,3-cyclohexane, 1,4-cyclohexane, 1,3- or 1,4-tetramethylxylene, isophorone, 4,4-dicyclohexylmethane and lysine ester diisocyanates. In one embodiment, tetramethylxylylene diisocyanate (TMXDI) is utilized as the polyisocyanate.

Examples of suitable isocyanates having a functionality of at least three are the trimerization and oligomerization products of the polyisocyanates already mentioned above, such as are obtainable, with the formation of isocyanurate rings, by appropriate reaction of polyisocyanates, preferably of diisocyanates. Where oligomerization products are used, those particularly suitable have a degree of oligomerization of on average from about 3 to about 5.

Isocyanates suitable for the preparation of trimers are the diisocyanates already mentioned above, particular preference being given to the trimerization products of the isocyanates HDI, MDI or IPDI.

Likewise suitable for use are the polymeric isocyanates, such as are obtained, for example, as a residue in the distillation bottoms from the distillation of diisocyanates. Particularly suitable in this context is the polymeric MDI as is obtainable as, a distillation residue from the distillation of MDI.

Component A preferably is formulated to have an isocyanate functionality of greater than 2. Use of a Component A having an isocyanate functionality of 2 or less is not likely to provide a robust laminating adhesive.

Component A preferably is formulated to have a viscosity of not greater than about 10,000 cps (more preferably, not greater than about 5000 cps; most preferably, not greater than about 3500 cps) at 25 degrees C. and a viscosity of not greater than about 2500 cps (more preferably, not greater than about 2000 cps) at 60 degrees C.

Component B

Component B comprises a mixture of a high functionality polyester polyol containing at least four hydroxyl groups per molecule with at least two primary OH groups on the molecule and two secondary OH groups on the molecule; a trifunctional polyol containing three OH groups on the molecule; and a difunctional polyol containing two OH groups on the molecule.

In one embodiment, the high functionality polyol contains two pairs of hydroxyl groups per molecule, wherein the hydroxyl groups within each pair are separated by two or three carbon atoms and the two pairs of hydroxyl groups are separated by at least eight atoms. The hydroxyl groups preferably are primary and/or secondary hydroxyl groups. In one embodiment, the high functionality polyol contains both primary and secondary hydroxyl groups. In another embodiment, the hydroxyl groups are attached to aliphatic carbon atoms.

Limited testing indicates that use of high functionality polyether polyols alone and polyester ether polyols (sometimes also referred to as polyether ester polyols) alone as the Component B mixture does not generally result in the formation of a robust flexible packaging adhesive.

Illustrative high functionality polyester polyols suitable for use may correspond to the following general structure (I):

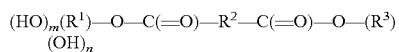

wherein m and n are integers which are the same or different and which each have a value of at least 1, m+n=at least 4, and $R^1$, $R^2$ and $R^3$ are hydrocarbon radicals (preferably containing from 2 to 20 carbon atoms). $R^1$ has a valency of m+1 (with m OH groups being attached thereto), $R^2$ has a valency of 2, and $R^3$ has a valency of n+1 (with n OH groups being attached thereto). The hydrocarbon radicals may be linear or branched, aliphatic cycloaliphatic, aromatic or aralkyl, saturated or unsaturated. For example, $R^1$ and $R^3$ may each be a —$CH_2$—CH—$CH_2$— group. $R^2$ may, for example, be a —$(CH_2)_o$— moiety, where o is an integer of from 2 to 18.

High functionality polyester polyols corresponding to the above-mentioned general structure (I) may be prepared by reacting a molar excess of one or more polyols bearing two (preferably three) or more hydroxyl groups per molecule with a dicarboxylic acid or dicarboxylic acid diester, for example. Suitable polyols for such purpose include glycerin, trimethylolpropane, trimethylolethane, pentaerythritol, sugar alcohols, sugars, glycosides and also oligomeric ethers of said substances with themselves or in a mixture of two or more of said ethers with one another. As the polyol component it is additionally possible to use reaction products of such polyols with alkylene oxides, referred to as polyether polyols. The alkylene oxides have preferably 2 to 4 carbon atoms. Suitable examples are the reaction products of polyols such as glycerin, trimethylolethane, trimethylolpropane, pentaerythritol, sugars, glycosides or sugar alcohols, or mixtures of two or more thereof with ethylene oxide, propylene oxide or butylene oxide, or with mixtures of two or more such alkylene oxides. In some embodiments the high functionality polyether polyols have a molecular weight from about 100 to about 5,000, preferably from about 100 to about 1,000.

The dicarboxylic acid reacted with the aforementioned polyol to form the high functionality polyester polyol may be any linear or branched, aliphatic, aromatic, alicyclic, saturated or unsaturated organic compound containing two carboxylic acid groups per molecule. In one embodiment, a linear aliphatic saturated dicarboxylic acid is employed such as, for example, succinic acid, adipic acid, azelaic acid, sebacic acid, dodecanedicarboxylic acid, and the like. The dicarboxylic acid may, for example, correspond to the structure HO—C(=O)—$(CH_2)_m$—C(=O)—OH, where n=2-18. Preferably, the polyol and the dicarboxylic acid are reacted at a molar ratio of about 2:1. The reaction may be carried out under conditions effective to remove the water formed as a result of the condensation between the hydroxyl groups of the polyol and the acid groups of the dicarboxylic acid. Catalysts may be employed to accelerate the rate of condensation.

Other exemplary high functionality polyester polyols suitable for use in the disclosed robust adhesives have the following general structure (II):

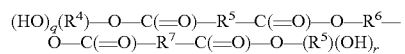

wherein q and r are integers which are the same or different and which each have a value of at least 1, q+r=at least 4, $R^4$, $R^5$, $R^7$ and $R^8$ are hydrocarbon radicals which may be the same or different (preferably containing from 2 to 20 carbon atoms), and $R^6$ is a divalent radical selected from the group consisting of hydrocarbon radicals and polyoxyalkylene radicals. $R^4$ has a valency of q+1 (with q OH groups being attached thereto), $R^5$ and $R^7$ each are divalent, and $R^8$ has a valency of r+1 (with r OH groups being attached thereto). The hydrocarbon radicals may be linear or branched, aliphatic cycloaliphatic, aromatic or aralkyl, saturated or unsaturated. For example, $R^4$ and $R^8$ may each be a —$CH_2$—CH—$CH_2$— group. $R^5$, $R^6$ and $R^7$ may, for example, each be a —$(CH_2)_o$— moiety, where o is an integer of from 2 to 18. $R^6$ may alternatively be a polyoxyalkylene radical such as, for example, a radical corresponding to the structure —$[(CH_2)_s$—$CHR^9$—O$]_t$—$(CH_2)_u$—$CHR^{10}$—, wherein s and u are integers of 1 to 3, t is at least 1, and $R^9$ and $R^{10}$ are independently selected from the group consisting of H, methyl or ethyl (where $R^9$ may be the same or different in each —$(CH_2)_s$—$CHR^9$—O— moiety when t is greater than 1). For instance, the polyoxyalkylene radical may be selected from the group consisting of polyoxyethylene radicals, polyoxypropylene radicals and polyoxytetramethylene radicals. High functionality polyester polyols of general structure (II) may generally be prepared by reacting a difunctional alcohol with a dicarboxylic acid so as to react each hydroxyl group of the alcohol with one molecule of the dicarboxylic acid. The remaining unreacted acid groups derived from the dicarboxylic acid are then reacted with one or more polyols containing three or more hydroxyl groups per molecule. The dicarboxylic acid and polyol may, for example, be any of the exemplary compounds discussed hereinabove in connection with the high functionality polyester polyols of general structure (I). The difunctional alcohol may be any monomeric, oligomeric, or polymeric compound containing two hydroxyl groups per molecule such as, for example, ethylene glycol, diethylene glycol, triethylene glycol, polyethylene glycol, 1,2-propylene glycol, 1,3-propylene glycol, dipropylene glycol, tripropylene glycol, polypropylene glycol, neopentyl glycol, 2-methyl-1,3-propanediol, 1,4-butanediol, polytetrahydrofuran diol, bis-phenol A, bis-phenol F, and the like. In one embodiment, a polyether glycol (in particular, a polypropylene glycol) having a molecular weight of from about 200 to about 3000 is utilized.

Suitable high functionality polyols may also be prepared by esterification of a compound containing four or more carboxylic acid groups per molecule with a compound containing two hydroxyl groups per molecule (such as, for example, ethylene glycol, propylene glycol, diethylene glycol, butylene glycol, neopentyl glycol, 2-methyl-1,3-propanediol, 1,6-hexanediol and mixtures thereof) under conditions such that each of the carboxylic acid groups is reacted with a molecule of the compound containing two hydroxyl groups per molecule. Polycaprolactone polyols containing four or more hydroxyl groups per molecule, such as the tetrafunctional polycaprolactones sold under the trademark CAPA 4101 by Solvay S.A. may also be used as the high functionality polyol component.

Component B can contain about 50 wt % to about 90 wt % high functionality polyol. Use of lower or higher amounts of high functionality polyol in component B may not provide the advantageous robust performance. In some embodiments the high functionality polyol can have a number average molecular weight of from about 400 to about 2,000.

Component B can contain about 5 wt % to about 30 wt %, more preferably 10 wt % to about 19 wt % trifunctional polyol. Use of lower or higher amounts of trifunctional polyol in component B may not provide the advantageous robust performance. The trifunctional polyol or polyols can be trifunctional polyether polyols, for example based on polypropylene glycol. In some embodiments the trifunctional polyol can have a number average molecular weight of from about 90 to about 2,000, more preferably 90 to 1,000.

Component B can contain about 0 wt % to about 20 wt %, for example about 5% to about 20% and advantageously about 13 wt % to about 17 wt % difunctional polyol. Use of lower or higher amounts of difunctional polyol in component B may not provide the advantageous robust performance. The difunctional polyol or polyols can be difunctional polyester polyols. Difunctional polyester polyols can be obtained by reacting dibasic acids or diester or anhydrides thereof such as adipic acid with glycols such as neopentyl glycol. Polycaprolactone polyols may also be used. In some embodiments the difunctional polyol can have a number average molecular weight of from about 20 to about 2000.

The high functionality polyol(s), trifunctional polyol(s) and difunctional polyol(s) should be selected so as to be compatible with each other. That is, the mixture of the different polyols should be homogeneous in appearance and should not exhibit any tendency to phase separate at normal storage and use temperatures (e.g., about 15° C. to about 100° C.).

The amounts of Component A and Component B used in the robust laminating adhesive systems of this invention will generally be adjusted so as to provide an NCO/active hydrogen equivalent ratio in the range of from about 1:1 to 10:1 in one embodiment of the invention, from about 1.05:1 to about 5:1 in another embodiment, and from about 1.1:1 to about 2:1 in yet another embodiment. Typically, the free isocyanate content (prior to any reaction between Component A and Component B) will be from about 1% to about 25% by weight based on the total weight of the two components adhesive. The weight ratio of Component A to Component B may vary within wide limits, with the optimum ratio being dependent upon the composition of each of Component A and Component B.

The mixed adhesive will have a predetermined or "on ratio" weight ratio of Component A to Component B. The on ratio weight ratio of A:B in the mixed adhesive is from about 4:1 to about 1:5 (or, in one embodiment, about 1.6:1). Surprisingly, the adhesive is robust, e.g. the amount of Component A and Component B in the mixed adhesive can be varied by ±25% from the on ratio and the adhesive will retain its properties.

The mixture of Component A and Component B when first combined will have a viscosity of about 700 cps to about 5000 cps (more preferably, about 900 to about 2500 cps at application temperature. Mixed adhesive viscosities above 5,000 cps at application temperature are difficult or impossible to run on conventional laminating equipment. Typical application temperatures for flexible packaging lamination are about 35° C., although higher or lower application temperatures may be useful in some applications.

Typically, the mixed adhesive will have a pot-life of at least about 25 minutes and more preferably at least about 30 minutes. The viscosity of the mixed adhesive does not increase above about two times the initial viscosity during the pot life after Component A and Component B are mixed and held at a temperature of 40° C.

Where appropriate, in addition to Component A and Component B, the robust, two component laminating adhesive may comprise one or more further additives that are conventionally used in flexible packaging laminating adhesives. The additives may, for example, account for up to about 10% by weight of the overall two component adhesive. The additives may be in either of Components A and B. The optional additives which can be used in the context of the present disclosure include solvents, water, catalysts, curing agents, accelerators, plasticizers, stabilizers, antioxidants, light stabilizers, fillers, dyes, pigments, fragrances, preservatives or mixtures thereof.

In one embodiment, Component B additionally contains up to about 15% by weight (in another embodiment, up to about 10% by weight) of one or more monomeric polyols containing two or three hydroxyl groups per molecule. Exemplary monomeric polyols include glycerol and trimethylolpropane.

The film or films to be coated and adhered to each other using the robust, two component adhesive formulations may be comprised of any of the materials known in the art to be suitable for use in flexible packaging, including both polymeric and metallic materials as well as paper (including treated or coated paper). Thermoplastics are particularly preferred for use as at least one of the layers. The materials chosen for individual layers in a laminate are selected to achieve specific desired combinations of properties, e.g., mechanical strength, tear resistance, elongation, puncture resistance, flexibility/stiffness, gas and water vapor permeability, oil and grease permeability, heat sealability, adhesiveness, optical properties (e.g., clear, translucent, opaque), formability, merchantability and relative cost. Individual layers may be pure polymers or blends of different polymers. The polymeric layers are often formulated with colorants, anti-slip, anti-block, and anti-static processing aids, plasticizers, lubricants, fillers, stabilizers and the like to enhance certain layer characteristics.

Particularly preferred polymers for use include, but not limited to, polyethylene (including low density polyethylene (LDPE), medium density polyethylene (MDPE), high density polyethylene (HPDE), high molecular weight, high density polyethylene (HMW-HDPE), linear low density polyethylene (LLDPE), linear medium density polyethylene (LMPE)), polypropylene (PP), oriented polypropylene, polyesters such as poly (ethylene terephthalate) (PET) and poly (butylene terephthalate) (PBT), ethylene-vinyl acetate copolymers (EVA), ethylene-acrylic acid copolymers (EAA), ethylene-methyl methacrylate copolymers (EMA), ethylene-methacrylic acid salts (ionomers), hydrolyzed ethylene-vinyl acetate copolymers (EVOH), polyamides (nylon), polyvinyl chloride (PVC), poly(vinylidene chloride) copolymers (PVDC), polybutylene, ethylene-propylene copolymers, polycarbonates (PC), polystyrene (PS), styrene copolymers, high impact polystyrene (HIPS), acrylonitrile-butadiene-styrene polymers (ABS), acrylonitrile copolymers (AN), polyamide (Nylon), polylactic acid (PLA), regenerated cellulose films (Cellophane).

The polymer surface may be treated or coated, if so desired. For example, a film of polymer may be metallized by depositing a thin metal vapor such as aluminum onto the film's surface. Metallization may enhance the barrier properties of the finished laminate. The polymer film surface may also be coated with anti-fog additive or the like or subjected to a pretreatment with electrical or corona discharges, or ozone or other chemical agents to increase its adhesive receptivity. A coating of an inorganic oxide such as SiOx or AlOx may also be present on the polymer surface (for example, an SiOx- or AlOx-coated PET film).

One or more layers of the laminate may also comprise a metal film or foil, such as aluminum foil, or the like. The metal foil will preferably have a thickness of about 5 to 100 μm.

The individual films comprising the laminates can be prepared in widely varying thicknesses, for example, from about 5 to about 200 microns. The films, foils, and laminating adhesive formulation can be assembled into the laminate by using any one or more of the several conventional procedures known in the art for such purpose. For instance, the adhesive formulation may be applied to the surface of one or both of two films/foils by means of extrusion, brushes, rollers, blades, spraying or the like and the film/foil surfaces bearing the adhesive composition brought together and passed through a set of rollers (often referred to as nip rollers) which press together the film/foils having the adhesive composition between the films/foils. The resulting laminate may be rolled or wound onto a reel for ageing. The adhesive may be applied by conventional techniques; e.g., by a multi-roll application station.

One way of applying the robust adhesive composition to a substrate such as a film or foil is through the use of a series of smooth surface rubber and steel transfer rollers on a solventless adhesive laminator. The components of the adhesive are mixed using Meter/Mix/Dispense (MMD) equipment capable of automatically measuring and mixing the correct amounts of the components and delivering the resulting mixture to the laminator. The mixed adhesive is deposited on the first two rollers and metered by the remaining rollers in the application station (typically, 3 to 5 rollers). The flow characteristics of the adhesive composition may be improved by heating the first two rollers to a temperature of from about 35 to about 60 degrees C. Typically, the final application roller is heated to a temperature of from about 40 to about 60 degrees C. Modifications of these temperatures may be required depending upon line speed, substrates and roller size.

The coating weight at which the adhesive formulation can be applied to the surface of a film layer is in the range of about 0.12 to about 3.1 lbs/3000 sq. ft, and more typically about 0.8 to about 1.4 lbs/3000 sq. ft.

A second film or foil substrate is pressed against the substrate having the adhesive applied thereon by means of one or more nip rollers. Nip temperatures may be adjusted as needed depending upon line speed, thickness of the laminate, reactivity and other characteristics of the adhesive, and the substrates being laminated, but temperatures of from about 45 to about 90° C. are typically suitable.

It may be desirable to heat the laminate at an elevated temperature (e.g., about 40° C. to about 100° C.) so as to accelerate full curing of the adhesive composition. Alternatively, the adhesive composition can be curable at approximately room temperature (e.g., about 20° C. to about 25° C.) or higher over a period of from about 1 to about 14 days.

Generally speaking, the robust adhesive compositions are believed to be largely chemically cured through the reaction of the formulation constituents containing isocyanate groups and the constituents containing hydroxyl or other active hydrogen groups. However, curing can also be accomplished at least in part through moisture curing. Although sufficient moisture may be inherently present on the film or foil surfaces for this purpose, water may also be deliberately introduced through conventional methods if so desired.

Laminates prepared in accordance with the present disclosure may be used for packaging purposes in the same manner as conventional or known flexible laminated packaging films. The laminates are particularly suitable for forming into flexible pouch-shaped container vessels capable of being filed with a foodstuff and sealed. For example, two rectangular or square sheets of the laminate may be piled in the desired configuration or arrangement; preferably, the two layers of the two sheets which face each other are capable of being heat-sealed to each other. Three peripheral portions of the piled assembly are then heat-sealed to form the pouch. Heat-sealing can easily be accomplished by means of a heating bar, heating knife, heating wire, impulse sealer, ultrasonic sealer, or induction heating sealer.

The foodstuff is thereafter packed in the so-formed pouch. If necessary, gasses injurious to the foodstuff such as air are removed by known means such as vacuum degasification, hot packing, boiling degasification, or steam jetting or vessel deformation. The pouch opening is then sealed using heat. The packed pouch may be heated at a later time.

Example 1

Component A-1: A blend containing 70% by weight of a TDI-based prepolymer obtained from Air Products (7.45% NCO) and 30% by weight of an MDI-based prepolymer obtained from Bayer Chemical Co. (22.9% NCO). Component A-1 has an NCO content of 12% by weight.

Component A-2: A blend containing 92% by weight of an MDI-based prepolymer (16% NCO) obtained from Bayer Chemical Co. and 8% by weight of an aliphatic prepolymer obtained from Bayer Chemical Co. (22% NCO). Component A-2 has NCO content of 17% by weight.

Component B-1: A blend containing 31.8% by weight of a tetrafunctional polyester polyol (TFPP-1), 51.8% by weight of a difunctional polyester polyol derived from diethylene glycol and ortho-phthalic acid (hydroxyl number=110) and 16.4% by weight of a difunctional polyester polyol derived from diethylene glycol and adipic acid (hydroxyl number=210). TFPP-1 has a hydroxyl number of 740 and is made by reacting two moles of glycerin with one mole of adipic acid.

Component B-2: A blend containing 31.8% by weight TFPP-1, 51.8% by weight of a difunctional polyester polyol derived from diethylene glycol and ortho-phthalic acid (hydroxyl number=110), and 16.4% by weight of a difunctional polyester polyol derived from diethylene glycol and adipic acid (hydroxyl number=55).

Component B-3: A blend containing 50% by weight TFFP-1, 20% by weight of a difunctional polyester polyol derived from diethylene glycol and ortho-phthalic acid (hydroxyl number=110), and 30% by weight of a difunctional polyester polyol derived from diethylene glycol and adipic acid (hydroxyl number=55).

Component B-4: A blend of 50% by weight of a difunctional polyester polyol derived from diethylene glycol and ortho-phthalic acid (hydroxyl number=110) and 50% by weight of a difunctional polyester polyol derived from diethylene glycol and adipic acid (hydroxyl number=55).

Component B-5: A blend of 20% by weight TFPP-1, 40% by weight of a difunctional polyester polyol derived from diethylene glycol and ortho-phthalic acid (hydroxyl number=110) and 40% by weight of a difunctional polyester polyol derived from diethylene glycol and adipic acid (hydroxyl number=55).

Component B-6: A blend of 96% by weight difunctional polyester polyol obtained from Bayer Chemical Company having a hydroxyl number of 210 and 4% trimethylolpropane (a trifunctional polyol).

Component B-7: A blend of 33% by weight of a tetrafunctional polyester polyol (TFPP-2), 61.3% by weight of a difunctional polyester polyol derived from diethylene glycol and ortho-phthalic acid (hydroxyl number=110), and 5.7% by weight of trimethylolpropane. TFPP-2 has a hydroxyl number of 158 and is prepared by reacting 2 moles of glycerin, 1 mole of polypropylene glycol having a number average molecular weight of 1025 and 2 moles of adipic acid.

Component B-8: A blend of 5 parts by weight pentaerythritol, 6 parts by weight trimethylolpropane and 65 parts by weight difunctional polyester polyol derived from diethylene glycol and ortho-phthalic acid (hydroxyl number=110). The pentaerythritol did not dissolve in the other components of the blend even after heating 1 hour at 150 degrees C.; Component B-8 was not further evaluated.

Component B-9: A blend of 5 parts by weight pentaerythritol, 6 parts by weight glycerol, and 65 parts by weight difunctional polyester polyol derived from diethylene glycol and ortho-phthalic acid (hydroxyl number=110). The pentaerythritol did not dissolve in the other components of the blend even after heating 1 hour at 150 degrees C.; Component B-9 was not further evaluated.

Component B-10: A blend of 35 parts by weight pentaerythritol ethoxylate (3 moles EO/mole pentaerythritol, obtained from Aldrich), 6 parts by weight trimethylolpropane, and 65 parts by weight difunctional polyester polyol derived from diethylene glycol and ortho-phthalic acid (hydroxyl number=110). The components of the blend separated; Component B-10 was not further evaluated.

Component B-11: A blend of 35 parts by weight pentaerythritol ethoxylate (15 moles EO/mole pentaerythritol, obtained from Aldrich), 6 parts by weight trimethylolpropane, and 65 parts by weight difunctional polyester polyol derived from diethylene glycol and ortho-phthalic acid (hydroxyl number=110). The components of the blend separated; Component B-11 was not further evaluated.

Component B-12: A blend of 35 parts by weight pentaerythritol propoxylate (5 moles PO/mole pentaerythritol, obtained from Aldrich), 6 parts by weight trimethylolpropane, and 65 parts by weight difunctional polyester polyol derived from diethylene glycol and ortho-phthalic acid (hydroxyl number=110).

Component B-13: A blend of 35 parts by weight pentaerythritol propoxylate (17 moles EO/mole pentaerythritol, obtained from Aldrich), 6 parts by weight trimethylolpropane, and 65 parts by weight difunctional polyester polyol derived from diethylene glycol and ortho-phthalic acid (hydroxyl number=110).

Component B-14: A blend of 35 parts by weight pentaerythritol ethoxylate/propoxylate (obtained from Aldrich), 6 parts by weight trimethylolpropane, and 65 parts by weight difunctional polyester polyol derived from diethylene glycol and ortho-phthalic acid (hydroxyl number=110). The components of the blend separated; Component B-14 was not further evaluated.

Component B-15: A blend of 35 parts by weight TFPP-2, 6 parts by weight trimethylolpropane, and 65 parts by weight polypropylene glycol having a molecular weight of about 2000 (hydroxyl no.=55.4).

Component B-16: A blend of 35 parts by weight TFPP-2, 6 parts by weight trimethylolpropane, and 65 parts by weight difunctional polyester polyol derived from diethylene glycol and adipic acid (hydroxyl number=55).

Component B-17: A blend of 35 parts by weight TFPP-2, 6 parts by weight trimethylolpropane, and 65 parts by weight trifunctional polyether polyol prepared from propylene oxide and a trifunctional starter molecule.

Component B-18: A blend of 35 parts by weight TFPP-2, 6 parts by weight trimethylolpropane, and 65 parts by weight polypropylene glycol (hydroxyl no.=264).

Component B-19: A blend of 35 parts by weight TFPP-2, 6 parts by weight trimethylolpropane, and 65 parts by weight difunctional polyester polyol obtained from diethylene glycol and adipic acid (hydroxyl no.=210).

Component B-20: A blend of 35 parts by weight TFPP-2, 6 parts by weight trimethylolpropane, 32.5 parts by weight difunctional polyester polyol obtained from diethylene glycol and adipic acid (hydroxyl no.=210), and 32.5 parts by weight polyester polyol obtained from diethylene glycol and adipic acid (hydroxyl no.=55).

Component B-21: A blend of 35 parts by weight TFPP-2, 6 parts by weight glycerol, and 65 parts by weight difunctional polyester polyol obtained from diethylene glycol and adipic acid (hydroxyl no.=210).

Component A-3: A blend containing 97% by weight of MDI-based prepolymer (16% NCO) and 3% by weight of an aliphatic prepolymer (22% NCO) available from Henkel Corporation as Tycel 7660.

Component B-22: A blend containing 95% by weight of difunctional polyester polyol obtained from Bayer Chemical Company having a hydroxyl number of 210 and 5% by weight of trimethylolpropane (TMP).

Component B-23: A blend containing 72% by, weight of a tetrafunctional polyester polyol (TFPP-2); 15% by weight difunctional polyol based on neopentyl glycol and adipic acid; 11% by weight trifunctional polypropyleneglycol; and 2% by weight adhesion promoter (Silquest A-187).

Pot-Life

Components A-3 and B-22 were mixed at about a 1.7:1 ratio by weight to form a laminating adhesive. Components A-3 and B-23 were mixed at about a 1.6:1 ratio by weight to form a robust laminating adhesive. The viscosity of each mixed adhesives was checked initially and at 5 minute intervals. The results are shown in the following Table below and in FIG. 1.

TABLE 1

| minutes | A-3 and B-22 comparative adhesive | A-3 and B-23 robust adhesive |
| --- | --- | --- |
| 0 | 1000 | 1375 |
| 5 | 1150 | 1375 |
| 10 | 1500 | 1563 |
| 15 | 2100 | 1813 |
| 20 | 2800 | 2188 |
| 25 | 3650 | 2500 |
| 30 | 4650 | 2813 |
| 35 | 5700 | 3188 |
| 40 | 7000 | 3563 |
| 45 | 8500 | 4000 |
| 50 | 10500 | 4438 |
| 55 | 12500 | 4938 |
| 60 | 14700 | 5500 |

As shown in this Table and FIG. 1 the pot-life of the robust system is almost 30 minutes. The non-robust comparative adhesive even at the predetermined on-ratio mixture is less than 15 minutes for the. As shown by FIG. 1 the comparative adhesive appears to cure at a much faster rate than the robust adhesive. The comparative adhesive reaches a viscosity of 5000 cps in less than 35 minutes. It takes almost 60 minutes for the robust adhesive to reach a viscosity of 5000 cps, which makes the robust adhesive easy to handle in laminating operations and easy to clean from laminating equipment.

Cure Speed and Bond Strength

Given the long pot-life of the robust adhesive a skilled person would expect that it would also cure more slowly and consequently develop strength more slowly, than the conventional adhesive. One way to measure the cure speed is to measure the bond strength of a laminate over time.

Components A-3 and B-22 were mixed at a 1.7:1 ratio by weight to form a conventional laminating adhesive. Components A-3 and B-23 were mixed at a 1.6:1 ratio by weight to form a robust laminating adhesive.

A plurality of 1 inch strips of 48 gauge polyethylene terephthalate were bonded to a 1 inch strips of polyethylene using each adhesive. The samples were cured at room temperature. Samples cured for 24, 48 and 72 hours were placed in a tensile tester in a T peel test configuration. In some cases the tensile test was done at 70° C. in a temperature controlled environment.

Figure 2:
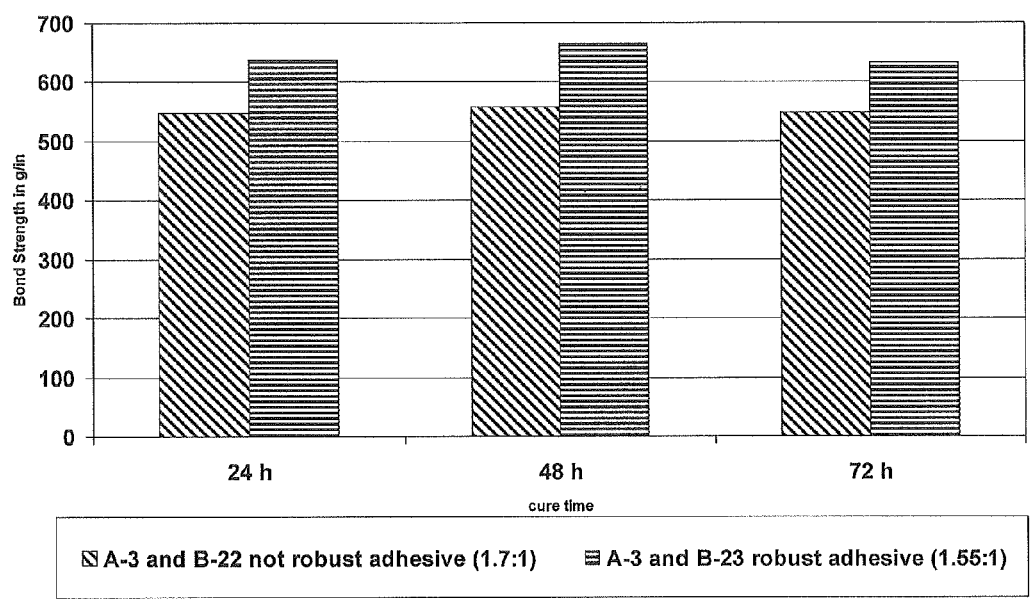
FIG. 2 is a graph showing room temperature cure speed of the disclosed robust adhesive compared to a conventional adhesive.

As shown by FIG. 2, the robust adhesive surprisingly develops bond strength as fast as the comparative adhesive. In both cases testing showed failure of the strips and not of the adhesive at all times.

Room Temperature Cure Speed and Bond Strength at Varying Mix Ratios

Components A-3 and B-22 were mixed at 1.2:1; 1.7:1 and 2:1 ratios by weight to form a series of comparative laminating adhesives. Components A-3 and B-23 were mixed at 1.2:1; 1.6:1 and 2:1 ratios by weight to form a series of robust laminating adhesives.

A plurality of 1 inch strips of 48 gauge polyethylene terephthalate were bonded to a 1 inch strips of polyethylene using each adhesive. The samples were cured at room temperature (about 20-25° C.) and the force in grams required to pull the sample apart was measured at 24, 48 and 72 hours. In all cases testing showed failure of the strips and not of the adhesive.

Figure 3:
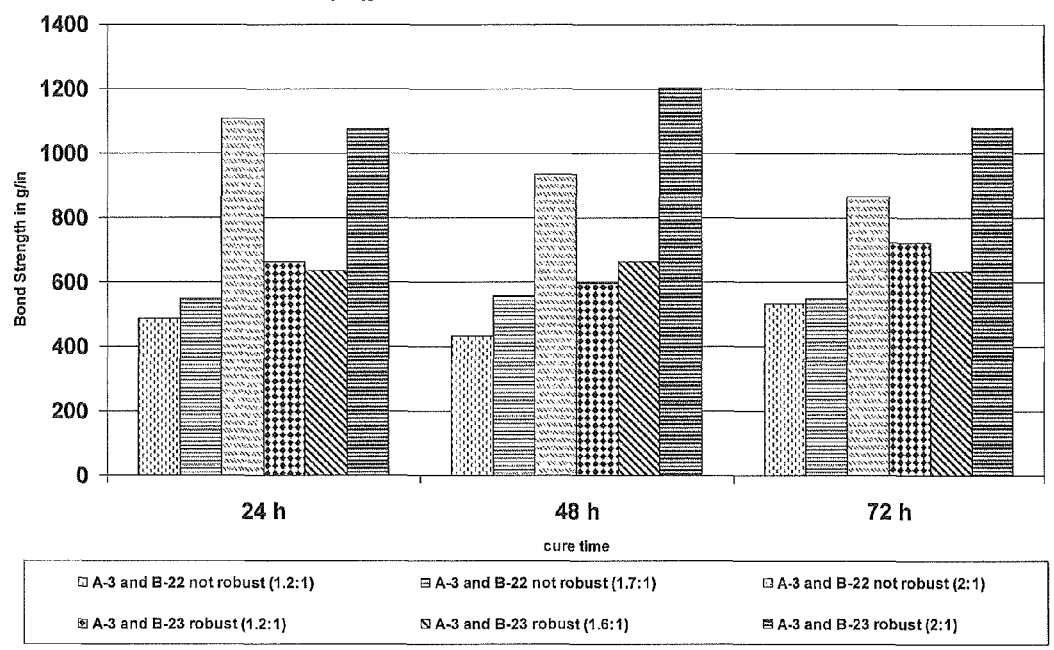
FIG. 3 is a graph showing room temperature cure speed and bond strength for the disclosed robust adhesive and a conventional adhesive at varying mix ratios.

In FIG. 3 the results for each cure time are arranged left to right in order of A-3/B22 (not robust) at 1.2:1; 1.7:1 and 2:1 ratios then A-3/B-23 (robust) at 1.2:1; 1.6:1 and 2:1 ratios. As shown by FIG. 3 all samples had acceptable room temperature bond strength at 24 hours cure. it appears that a mix ratio variation of ±25% does not affect the bond strength of either conventional or robust adhesives at room temperature.

Elevated Temperature Cure Speed and Bond Strength at Varying Mix Ratios

Components A-3 and B-22 were mixed at 1.2:1; 1.7:1 and 2:1 ratios by weight to form a series of comparative laminating adhesives. Components A-3 and B-23 were mixed at 1.2:1; 1.6:1 and 2:1 ratios by weight to form a series of robust laminating adhesives.

A plurality of 1 inch strips of 48 gauge polyethylene terephthalate were bonded to a 1 inch strips of polyethylene using each adhesive. The samples were cured and the force in g/in required to pull the sample apart at 70° C. (158° F.) was measured at 24, 48 and 72 hours. In some cases testing showed failure of the strips and in other cases testing showed failure of the adhesive.

Figure 4:
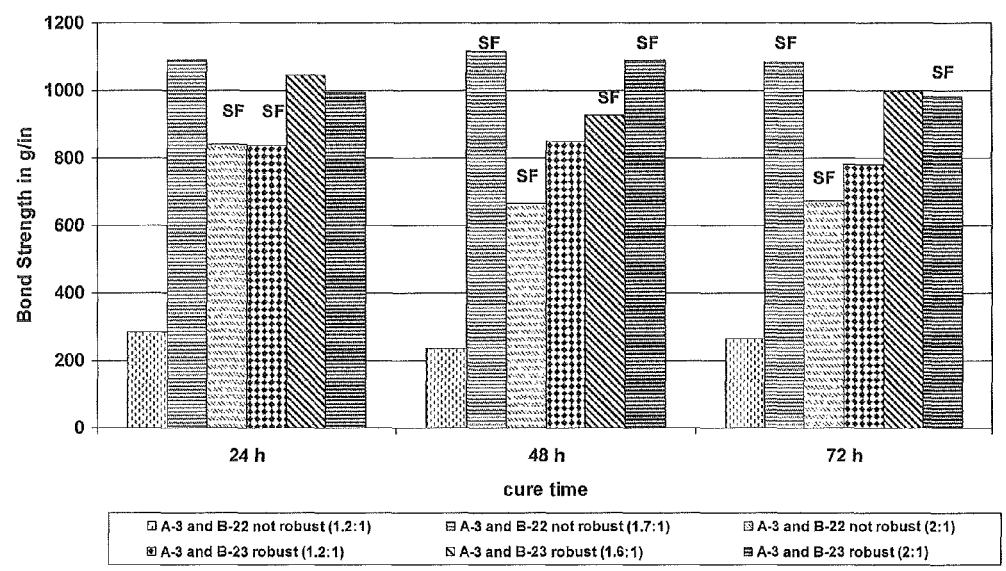
FIG. 4 is a graph showing elevated temperature cure speed and bond strength for the disclosed robust adhesive and a conventional adhesive at varying mix ratios.

A skilled person would expect that an excess of polyol will lower heat resistance and elevated temperature bond strength of polyurethane adhesives. In FIG. 4 the results for each cure time are arranged left to right in order of A-3/B22 (not robust) at 1.2:1; 1.7:1 and 2:1 ratios then A-3/B-23 (robust) at 1.2:1; 1.6:1 and 2:1 ratios. FIG. 4 illustrates this expectation, showing the much lower elevated temperature bond strength for the comparative adhesive having excess polyol (mix ratio of 1.2:1) in the adhesive. Very surprisingly, FIG. 4 shows that laminates made with robust adhesive were not affected by shifting the mix ratio by adding an additional 25 wt % polyol.

Boil Test Bond Strength at Varying Mix Ratios

An even more severe heat resistance test for polyurethane laminating adhesives is the so-called boil test.

Components A-3 and B-22 were mixed at 1.2:1; 1.7:1 and 2:1 ratios by weight to form a series of comparative laminating adhesives. Components A-3 and B-23 were mixed at 1.2:1; 1.6:1 and 2:1 ratios by weight to form a series of robust laminating adhesives.

Flexible packaging material is made by laminating multiple layers of film with a test adhesive. Pouches are made from the flexible packaging material. After a predetermined cure period the pouches are filled with water, sealed and boiled for 30 minutes. This test subjects the laminating adhesive to both elevated temperatures and elevated pressures to simulate conditions a flexible package might encounter during use. Test results are shown in the following Table.

TABLE 2

Boil Test results

| | 24 hr cure | 48 hr cure | 72 hr cure |
| --- | --- | --- | --- |
| A-3 and B-22 comparative (1.2:1) | fail | fail | fail |
| A-3 and B-22 comparative (1.7:1) | pass | ND[1] | ND[1] |
| A-3 and B-22 comparative (2:1) | pass | ND[1] | ND[1] |
| A-3 and B-23 robust (1.2:1) | pass | ND[1] | ND[1] |
| A-3 and B-23 robust (1.6:1) | pass | ND[1] | ND[1] |
| A-3 and B-23 robust (2:1) | pass | ND[1] | ND[1] |

ND[1] Not tested but expected to pass.

As discussed above it is expected that an excess of polyol will lower heat resistance and elevated temperature bond strength of polyurethane adhesives. The boil test results show that this is true for non-robust comparative adhesives having excess polyol (mix ratio of 1.2:1). Very surprisingly, the boil test results show that pouches made from flexible packaging material bonded with robust adhesive have sufficient hot strength to pass the boil test at all mix ratios, even when the adhesive had excess polyol component (mix ratio of 1.2:1). Even more surprising is the ability of the robust adhesive at this mix ratio to pass the boil test after only 24 hours of curing.

Migratory Primary Aromatic Amines

FDA compliance requires that the concentration of primary aromatic amines in a flexible packaging material used for food contact be below the detection limit (2 parts per billion (ppb) when tested by the migration test, also referred to as the BfR test method). Excess isocyanates in a laminating adhesive can react with moisture in packaged products to form primary aromatic amines. Thus, while the use of excess isocyanates may increase bond strength it can also lead to excessive primary aromatic amines and prolonged curing time for the finished packaging material to avoid failure under the photometric migration test.

Components A-3 and B-22 were mixed at 1.2:1; 1.7:1 and 2:1 ratios by weight to form a series of non-robust comparative laminating adhesives. Components A-3 and B-23 were mixed at 1.2:1; 1.6:1 and 2:1 ratios by weight to form a series of robust laminating adhesives.

Flexible packaging material is made by laminating multiple layers of film with a test adhesive. Pouches are made from the flexible packaging material. After a predetermined cure period the pouches were tested using the BfR test method. Test results are shown in the following Table.

TABLE 3

BfR test method results (<2 ppb to pass)

| | 24 hr cure | 48 hr cure | 72 hr cure |
|---|---|---|---|
| A-3 and B-22 comparative (1.2:1) | ND[1] | | |
| A-3 and B-22 comparative (1.7:1) | ND[1] | fail | pass |
| A-3 and B-22 comparative (2:1) | ND[1] | ND[1] | ND[1] |
| A-3 and B-23 robust (1.2:1) | | pass | pass |
| A-3 and B-23 robust (1.6:1) | | pass | pass |
| A-3 and B-23 robust (2:1) | ND[1] | fail | pass |

ND[1] Not tested but expected to fail.

The results confirm that an excess of isocyanate leads to the presence of primary aromatic amines for longer periods of time. The comparative laminating adhesive produced by mixing A-3 and B-22 at standard (1.7:1) mix ratios required curing for 72 hours to fully react isocyanates and provide acceptable test results. Other comparative polyurethane laminating adhesives typically require curing for more than 72 hours to fully react isocyanates and provide acceptable test results. The robust laminating adhesive cures more quickly and at standard on-ratio (1.6:1) mix ratio passes the photometric migration test in only 48 hours, a 24 hour reduction compared to the comparative laminating adhesive. Even with an excess of isocyanate (2:1 mix ratio or 25 wt % excess) the robust adhesive produces laminates which pass the BfR migration test in only 72 hours, a result which is not possible with the comparative adhesive having an excess of isocyanate (2:1 mix ratio or 25 wt % excess).

Resistance Against Solvents

As mentioned earlier to avoid loss of bond strength the recommended limit for mono-alcohols in a flexible packaging material application is very low (<3,900 mg/ream or less). The inventors added different amounts of Dowanol PM in a range of 4,000 mg/ream up to 16,000 mg/ream to adhesive mixtures of Components A-3 and B-23. Surprisingly, there were no negative effects on heat resistance of the robust adhesive even at the higher amounts. All pouches made with the robust adhesive provided acceptable bond strength using the boil test after curing for 24 hours.

Example 2

The following compositions were prepared.

Component A-4: MDI-based prepolymer (NCO=12%) prepared by reacting 4,4'-MDI with blend of a polyester polyol based on adipic acid, isophthalic acid, and diethylene glycol, and a polypropyleneglycol with an average molecular weight of 1025.

Component B-24: A tetrafunctional polyester polyol with a hydroxyl number of 158, which is prepared by reacting 2 moles of glycerin, 1 mole of polypropylene glycol having an average molecular weight of 1025 and 2 moles of adipic acid.

Component B-25: A blend containing 82.7% by weight of TFPP-2 and 17.3% by weight of a difunctional polypropyleneglycol with an average molecular weight of 1025. The blend has a hydroxyl number of 160.

Component B-26: A blend containing 86.3% by weight of TFPP-2 and 13.7% by weight of a trifunctional polypropyleneglycol with an average molecular weight of 260. The blend has a hydroxyl number of 216.

Component B-27: A blend containing 82.7% by weight of TFPP-2 and 17.3% by weight of a difunctional polyol based on neopentyl glycol and adipic acid. The blend has a hydroxyl number of 150.

Component B-28: A blend of 43.1% of a trifunctional polypropyleneglycol with an average molecular weight of 260 and 56.9% of a bisphenol A ethoxylate. The mixture has a hydroxyl number of 440.

Selected components were mixed to form a laminating adhesive. The mixtures were tested for pot-life. The mixtures were used as previously described to form a flexible packaging material. The prepared flexible packaging material was tested as previously described for high temperature bond strength after 24 hours and 96 hours of cure; and for migration, e.g. BfR test, after 3 days of cure. Results are summarized in the following Tables.

TABLE 4 non-robust laminating adhesives

| | Isocyanate material | | | | | |
|---|---|---|---|---|---|---|
| | -2 | -2 | -2 | -3 | -3 | -3 |
| | Polyol material | | | | | |
| | -7 | -7 | -7 | -22 | -22 | -22 |
| | mol ratio | | | | | |
| | 25% | n ratio 1.6:1 | 25% | 25% | n ratio 1.6:1 | 25% |
| | Pot - Life | | | | | |
| 0 minutes | 250 | 100 | 000 | 119 | 70 | 60 |
| 5 | 489 | 269 | 269 | 089 | 69 | 69 |
| 10 | 969 | 639 | 629 | 319 | 279 | 249 |
| 15 | 539 | 999 | 019 | 779 | 709 | 609 |
| 20 | 189 | 489 | 479 | 389 | 219 | 049 |
| 25 | 879 | 049 | 989 | 109 | 839 | 549 |
| 30 | 659 | 639 | 539 | 969 | 549 | 3119 |
| 35 | 518 | 269 | 099 | 958 | 359 | 3779 |
| 40 | 508 | 968 | 718 | 128 | 288 | 4539 |
| 45 | 588 | 748 | 428 | 478 | 6368 | 5418 |
| 50 | 858 | 648 | 198 | 058 | 7618 | 6408 |
| 55 | 0000 | 628 | 018 | — | 9038 | 7508 |
| 60 | — | 648 | 918 | — | — | 8788 |

TABLE 4-continued non-robust laminating adhesives

| | Isocyanate material | | | | | |
|---|---|---|---|---|---|---|
| | -2 | -2 | -2 | -3 | -3 | -3 |
| | | | Polyol material | | | |
| | -7 | -7 | -7 | -22 | -22 | -22 |
| | | | mol ratio | | | |
| | | n ratio | | | n ratio | |
| | 25% | 1.6:1 | 25% | 25% | 1.6:1 | 25% |
| pot-life (doubling) | 5 | 7 | 5 | 8 | 15 | 16 |
| pot-life (>5000 cP) | 2 | 0 | 2 | 35 | 38 | 42 |
| Bond strength 70° C. (g) | | | | | | |
| 24 hr cure | 225 | 910 | 815 | 390 | 860 | 815 |
| 4 day cure | 525 | 970 | 835 | 615 | 865 | 865 |
| Primary aromatic amines detected after 3 days | | | | | | |
| | No | No | No | No | No | No |

All of the above laminating adhesives unacceptably doubled in viscosity in 15 to 18 minutes at all ratios. Each of the above laminating adhesives also had a very short pot-life to 5,000 cP at all ratios. None of the above laminating adhesives are robust.

TABLE 5 non-robust and robust laminating adhesives

| | Isocyanate material | | | | | |
|---|---|---|---|---|---|---|
| | A-4 | A-4 | A-4 | A-1 | A-1 | A-1 |
| | | | Polyol material | | | |
| | B-23 | B-23 | B-23 | B-23 | B-23 | B-23 |
| | | | mol ratio | | | |
| | non-robust | | | robust | | |
| | | on ratio | | | on ratio | |
| | -25% | 1.6:1 | +25% | -25% | 1.6:1 | +25% |
| Pot - Life | | | | | | |
| 0 minutes | 1500 | 1625 | 1750 | 1039 | 1189 | 1209 |
| 5 | 1250 | 1125 | 1313 | 889 | 1059 | 1019 |
| 10 | 1500 | 1250 | 1438 | 999 | 1119 | 1039 |
| 15 | 1938 | 1500 | 1750 | 1199 | 1309 | 1129 |
| 20 | 2625 | 1938 | 2188 | 1449 | 1519 | 1299 |
| 25 | 3250 | 2375 | 2688 | 1669 | 1739 | 1469 |
| 30 | 4063 | 2875 | 3188 | 1859 | 1969 | 1649 |
| 35 | 4938 | 3438 | 3875 | 2069 | 2139 | 1839 |
| 40 | 5938 | 4063 | 4500 | 2299 | 2389 | 2059 |
| 45 | 7125 | 4813 | 5250 | 2539 | 2679 | 2289 |
| 50 | 8375 | 5625 | 6000 | 2839 | 2969 | 2539 |
| 55 | 9750 | 6563 | 7000 | 3109 | 3309 | 2819 |
| 60 | 11380 | 7625 | 8000 | 3469 | 3659 | 3109 |
| pot-life (doubling) | 25 | 35 | 33 | 25 | 30 | 35 |
| pot-life (>5000 cP) | 36 | 46 | 43 | 78 | 77 | 87 |
| Bond strength 70° C. (g) | | | | | | |
| 24 hr cure | 140 | 820 | 975 | 550 | 730 | 785 |
| 4 day cure | 95 | 740 | 870 | 710 | 720 | 700 |
| Primary aromatic amines detected after 3 days | | | | | | |
| | No | No | No | No | No | No |

The A-1/B-23 system maintained properties over the entire low, on ratio and high mix ratio range illustrating that the A-1/B-23 laminating adhesive is robust.

The A-4/B-23 system had unacceptable bond strength for a flexible packaging laminating adhesive at the lower ratio but acceptable bond strength on ratio and at the higher ratio. This lack of acceptable bond strength over the entire low to high mix ratio range illustrates a non-robust laminating adhesive system.

TABLE 6 robust laminating adhesives

| | Isocyanate material | | | | | |
|---|---|---|---|---|---|---|
| | A-3 | A-3 | A-3 | A-2 | A-2 | A-2 |
| | | | Polyol material | | | |
| | B-23 | B-23 | B-23 | B-23 | B-23 | B-23 |
| | | | mol ratio | | | |
| | | on ratio | | | on ratio | |
| | -25% | 1.6:1 | +25% | -25% | 1.6:1 | +25% |
| Pot - Life | | | | | | |
| 0 minutes | 875 | 1000 | 938 | 1059 | 949 | 849 |
| 5 | 813 | 875 | 750 | 1039 | 959 | 869 |
| 10 | 937 | 938 | 875 | 1089 | 1029 | 979 |
| 15 | 1125 | 1125 | 1063 | 1289 | 1209 | 1129 |
| 20 | 1250 | 1438 | 1250 | 1509 | 1419 | 1299 |
| 25 | 1500 | 1688 | 1438 | 1749 | 1629 | 1489 |
| 30 | 1688 | 2000 | 1688 | 1999 | 1849 | 1699 |
| 35 | 1938 | 2313 | 1938 | 2259 | 2089 | 1899 |
| 40 | 2188 | 2688 | 2125 | 2519 | 2319 | 2129 |
| 45 | 3413 | 3063 | 2438 | 2809 | 2569 | 2329 |
| 50 | 2750 | 3500 | 2750 | 3119 | 2839 | 2579 |
| 55 | 3063 | 3938 | 3063 | 3359 | 3129 | 2839 |
| 60 | 3375 | 4438 | 3375 | 3749 | 3459 | 3129 |
| pot-life (doubling) | 31 | 30 | 33 | 34 | 30 | 30 |
| pot-life (>5000 cP) | 80 | 65 | 80 | 75 | 81 | 87 |
| Bond strength 70° C. (g) | | | | | | |
| 24 hr cure | 285 | 890 | 840 | 275 | 915 | 905 |
| 4 day cure | 360 | 875 | 830 | 660 | 910 | 710 |
| Primary aromatic amines detected after 3 days | | | | | | |
| | No | No | No | No | No | No |

Both the A-3/B-23 and A-2/B-23 laminating adhesive compositions had a pot-life (time to initial viscosity doubling) of 30 minutes or more at low, normal and high mix ratios. Both the A-3/B-23 and A-2/B-23 laminating adhesive compositions had acceptable hot (70° C.) bond strength for flexible packaging lamination use after both 24 and 96 hour cure. Neither of the A-3/B-23 and A-2/B-23 laminating adhesive compositions had any detectable leaching of primary amines. Both the A-3/B-23 and A-2/B-23 laminating adhesive compositions were robust.

TABLE 7 non-robust laminating adhesives

| | Isocyanate material | | | | | |
|---|---|---|---|---|---|---|
| | A-2 | A-2 | A-2 | A-2 | A-2 | A-2 |
| | Polyol material | | | | | |
| | B-24 | B-24 | B-24 | B-25 | B-25 | B-25 |
| | mol ratio | | | | | |
| | -25% | on ratio 1.6:1 | +25% | -25% | on ratio 1.6:1 | +25% |
| Pot - Life | | | | | | |
| 0 minutes | 1500 | 1250 | 1250 | 1019 | 929 | 879 |
| 5 | 1188 | 1063 | 1000 | 939 | 899 | 839 |
| 10 | 1125 | 1125 | 1000 | 939 | 919 | 909 |
| 15 | 1250 | 1250 | 1125 | 1029 | 1029 | 1019 |
| 20 | 1375 | 1438 | 1250 | 1139 | 1159 | 1129 |
| 25 | 1563 | 1625 | 1375 | 1249 | 1309 | 1249 |
| 30 | 1688 | 1750 | 1500 | 1339 | 1419 | 1369 |
| 35 | 1875 | 1938 | 1625 | 1449 | 1519 | 1509 |
| 40 | 2000 | 2125 | 1750 | 1569 | 1639 | 1889 |
| 45 | 2250 | 2375 | 1875 | 1689 | 1769 | 2009 |
| 50 | 2375 | 2563 | 2000 | 1809 | 1909 | 2149 |
| 55 | 2625 | 2813 | 2188 | 1949 | 2049 | — |
| 60 | 2813 | 3000 | 2375 | 2079 | 2199 | — |
| pot-life (doubling) | >60 | 49 | >60 | 57 | 47 | 38 |
| pot-life (>5000 cP) | >60 | >60 | >60 | >60 | >60 | >60 |
| Bond strength 70° C. (g) | | | | | | |
| 24 hr cure | 70 | 810 | 750 | 0 | 280 | 860 |
| 4 day cure | 250 | 825 | 840 | 105 | 740 | 810 |
| Primary aromatic amines detected after 3 days | | | | | | |
| | No | No | No | No | No | No |

The A-2/B-24 and A-2/B-25 laminating adhesive compositions both had acceptable pot-life at all ratios. Neither of the laminating adhesive compositions had any detectable leaching of primary amines at any ratio. The A-2/B-24 and A-2/B-25 laminating adhesive compositions both had unacceptable hot strength (70° C.) at the low isocyanate ratio. This lack of adhesive bond strength over the entire low to high mix ratio range illustrates a non-robust laminating adhesive system.

TABLE 8 non-robust laminating adhesives

| | Isocyanate material | | | | | |
|---|---|---|---|---|---|---|
| | A-2 | A-2 | A-2 | A-2 | A-2 | A-2 |
| | Polyol material | | | | | |
| | B-27 | B-27 | B-27 | B-28 | B-28 | B-28 |
| | mol ratio | | | | | |
| | -25% | on ratio 1.6:1 | +25% | -25% | on ratio 1.6:1 | +25% |
| Pot - Life | | | | | | |
| 0 minutes | 1312 | 1125 | 1125 | 839 | 779 | 709 |
| 5 | 1125 | 1000 | 938 | 979 | 859 | 739 |
| 10 | 1250 | 1125 | 1063 | 1539 | 1159 | 949 |
| 15 | 1438 | 1313 | 1188 | 2479 | 1649 | 1269 |
| 20 | 1688 | 1500 | 1375 | 3789 | 2319 | 1699 |
| 25 | 1938 | 1688 | 1563 | 5448 | 3159 | 2209 |
| 30 | 2188 | 1938 | 1750 | 7668 | 4199 | 2809 |
| 35 | 2438 | 2125 | 2000 | >10K | 5458 | 3489 |
| 40 | 2688 | 2375 | 2188 | — | 028 | 4299 |
| 45 | 3000 | 2688 | 2438 | — | 8988 | 5038 |
| 50 | 3313 | 2938 | 2688 | — | >10K | 6108 |
| 55 | 3625 | 3188 | 2938 | — | — | 7378 |
| 60 | 4000 | 3500 | 3250 | — | — | 8848 |
| pot-life (doubling) | 39 | 36 | 41 | 11 | 14 | 17 |
| pot-life (>5000 cP) | 74 | 64 | >60 | 22 | 32 | 44 |
| Bond strength 70° C. (g) | | | | | | |
| 24 hr cure | 95 | 890 | 835 | 420 | 1000 | 760 |
| 4 day cure | 255 | 810 | 745 | 650 | 910 | 750 |
| Primary aromatic amines detected after 3 days | | | | | | |
| | No | No | No | Yes | No | No |

The A-2/B-27 laminating adhesive composition had acceptable pot-life over all ranges. The A-2/B-28 laminating adhesive composition had unacceptable pot-life at any ratio. The A-2/B-27 laminating adhesive composition had unacceptable hot (70° C.) adhesive bond strength at the low range but acceptable hot bond strength in the on ratio and high ranges. The A-2/B-28 laminating adhesive composition had acceptable hot (70° C.) adhesive bond strength at all ranges. The A-2/B-27 laminating adhesive composition had no detectable leaching of primary amines at any ratio. The A-2/B-28 laminating adhesive composition had detectable leaching of primary amines at the low ratio. The lack of pot-life at any range is unacceptable for a laminating adhesive. The unacceptable adhesive strength over the entire low to high mix ratio range illustrates that the A-2/B-27 laminating adhesive composition is not robust. Leaching of primary amines at the low ratio illustrates that the A-2/B-28 laminating adhesive composition is not robust.

TABLE 9 robust laminating adhesive

| | Isocyanate material | | |
|---|---|---|---|
| | A-2 | A-2 | A-2 |
| | Polyol material | | |
| | B-26 | B-26 | B-26 |
| | mol ratio | | |
| | -25% | on ratio 1.6:1 | +25% |
| Pot-Life | | | |
| 0 minutes | 1375 | 1375 | 1063 |
| 5 | 1000 | 1000 | 813 |
| 10 | 1063 | 938 | 875 |
| 15 | 1250 | 1063 | 1000 |
| 20 | 1500 | 1250 | 1188 |
| 25 | 1750 | 1437 | 1313 |
| 30 | 2000 | 1688 | 1500 |
| 35 | 2313 | 1938 | 1688 |
| 40 | 2688 | 2188 | 1938 |
| 45 | 3000 | 2438 | 2188 |

TABLE 9-continued robust laminating adhesive

| | Isocyanate material | | |
|---|---|---|---|
| | A-2 | A-2 | A-2 |
| | Polyol material | | |
| | B-26 | B-26 | B-26 |
| | mol ratio | | |
| | −25% | on ratio 1.6:1 | +25% |
| 50 | 3375 | 2750 | 2438 |
| 55 | 3813 | 3063 | 2688 |
| 60 | 4250 | 3375 | 2938 |
| pot-life (doubling) | 41 | 50 | 44 |
| pot-life (>5000 cP) | 67 | 80 | 89 |
| Bond strength 70° C. (g) | | | |
| 24 hr cure | 315 | 850 | 700 |
| 4 day cure | 690 | 810 | 820 |
| Primary aromatic amines detected after 3 days | | | |
| | No | No | No |

The A-2/B-26 laminating adhesive composition had acceptable pot-life throughout the low, on ratio and high mix ratio ranges. The A-2/B-26 laminating adhesive composition had acceptable hot (70° C.) adhesive strength throughout the low, on ratio and high mix ratio range. The A-2/B-26 laminating adhesive composition did not leach primary amines at any ratio in the low, on ratio and high range. Retention of properties throughout the low, on ratio and high mix ratio range illustrates that the A-2/B-26 laminating adhesive is robust.

Every two part polyurethane adhesive is not suitable for use as a flexible packaging laminating adhesive. Many two part polyurethane adhesives are not capable of application using lamination equipment conventionally used for producing flexible packaging material or do not have cured properties such as pot life or hot adhesive bond strength suitable for use in flexible packaging or migrate undesirable components into the food stuff contained in the flexible packaging.

Further, the results show that every flexible packaging laminating adhesive is not robust, e.g. does not retain properties throughout a range of excess isocyanate to excess polyol mix ratios. The robust laminating adhesives described herein are a selection of components that surprisingly retain properties throughout a range of excess isocyanate to excess polyol mix ratios.

What is claimed is:

1. A two component adhesive suitable for use in transfer roll lamination equipment to make flexible packaging material comprising Component A and Component B; Component A comprising an isocyanate-functionalized polyurethane prepolymer; and Component B comprising a mixture of a high functionality polyol containing at least four hydroxyl groups per molecule with at least two primary OH groups on the molecule and two secondary OH groups on the molecule and a trifunctional polyol containing three OH groups on the molecule; wherein a mixture of Component A and Component B at a predetermined weight ratio has a pot-life based on viscosity doubling of at least about 25 minutes at a temperature of 40° C., a bond strength at 70° C. of at least 200 grams per inch after 24 hours of cure and has a BfR migration after 3 days of cure of less than 2 parts per billion, and each of these properties remains present throughout the range of Component A:Component B weight ratios of 25% less component A than the predetermined weight ratio, to the predetermined weight ratio, to 25 wt % more Component A than the predetermined weight ratio.

2. The laminating adhesive of claim 1 wherein Component B comprises a difunctional polyol containing two OH groups on the molecule.

3. The laminating adhesive of claim 1 wherein the high functionality polyol is a polyester polyol.

4. The laminating adhesive of claim 1 wherein the trifunctional polyol is a polyether polyol.

5. The two component laminating adhesive of claim 1 comprising about 5 wt % to about 20 wt % of a difunctional polyol.

6. The laminating adhesive of claim 1, wherein the high functionality polyol has the following structure:

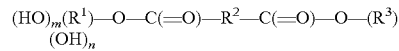

wherein m and n are integers which are the same or different and which each have a value of at least 1; m+n=at least 4; and $R^1$, $R^2$ and $R^3$ are hydrocarbon radicals.

7. The laminating adhesive of claim 1, wherein the high functionality polyol has the following structure:

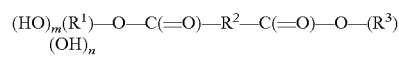

wherein m and n are integers which are the same or different and which each have a value of at least 1 and m+n=at least 4;

$R^1$ is a hydrocarbon radical having 2 to 20 carbon atoms and a valency of m+1 with m OH groups being attached thereto;

$R^2$ is a hydrocarbon radical having 2 to 20 carbon atoms and a valency of 2;

$R^3$ is a hydrocarbon radical having 2 to 20 carbon atoms and a valency of n+1 with n OH groups being attached thereto.

8. The laminating adhesive of claim 1, wherein the high functionality polyol has the following structure:

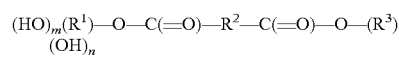

wherein m and n are integers which are the same or different and which each have a value of at least 1 and m+n=at least 4;

$R^1$ is a $CH_2$—CH—$CH_2$— group with a valency of m+1 with m OH groups being attached thereto;

$R^2$ is a —$(CH_2)_o$— moiety, where o is an integer of from 2 to 18; and $R^3$ is a $CH_2$—CH—$CH_2$— group with a valency of n+1 with n OH groups being attached thereto.

9. The laminating adhesive of claim 1, wherein the high functionality polyol has the following structure:

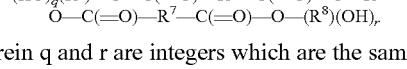

wherein q and r are integers which are the same or different and which each have a value of at least 1; q+r=at least 4; $R^4$, $R^5$, $R^7$ and $R^8$ are hydrocarbon radicals; and $R^6$ is a divalent radical selected from hydrocarbon radicals and polyoxyalkylene radicals.

10. A flexible packaging material comprising two films bonded together by cured reaction products of the adhesive of claim 1.

11. A flexible packaging material comprising a first layer comprised of a first polyolefin or first polyester; a second layer comprised of a second polyolefin, which may be the same or different from the first polyolefin, a second polyester, which may be the same as or different from the first polyester, or a metal foil; and cured reaction products of the adhesive of claim 1 bonding the first layer to the second layer.

12. A method of making a flexible film laminate, comprising:
  combining Component A and Component B of the laminating adhesive of claim 1 at a predetermined weight ratio to form an adhesive mixture;
  disposing the adhesive mixture on at least a portion of one surface of a first flexible film,
  joining the first flexible film and a second flexible film wherein the adhesive mixture is interposed between the first flexible film and the second flexible film; and
  curing the adhesive mixture.

13. Cured reaction products of the two component adhesive of claim 1.

14. A method of making a flexible film laminate, comprising:
  combining Component A and Component B of the laminating adhesive of claim 1 at a predetermined weight ratio to form an adhesive mixture;
  disposing the adhesive mixture on at least a portion of one surface of a first flexible film;
  joining the first flexible film and a second flexible film wherein the adhesive mixture is interposed between the first flexible film and the second flexible film; and
  curing the adhesive mixture.

* * * * *

UNITED STATES PATENT AND TRADEMARK OFFICE
CERTIFICATE OF CORRECTION

PATENT NO. : 9,580,538 B2
APPLICATION NO. : 13/280026
DATED : February 28, 2017
INVENTOR(S) : Guido Kollbach and Balasubramaniam Ramalingam Page 1 of 1

It is certified that error appears in the above-identified patent and that said Letters Patent is hereby corrected as shown below:

Column 9, Line 34: Change "-o- hydroxycaproic acid" to -- ω-hydroxycaproic acid --.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*